United States Patent
Andersson et al.

(10) Patent No.: US 7,546,253 B2
(45) Date of Patent: Jun. 9, 2009

(54) EQUIPMENT PROCUREMENT METHOD AND SYSTEM

(75) Inventors: Johan Andersson, Västerås (SE); Mikael Rudin, Västerås (SE); Tomas Pauly, Västerås (SE)

(73) Assignee: ABB AB, Vasteras (SE)

( * ) Notice: Subject to any disclaimer, the term of this patent is extended or adjusted under 35 U.S.C. 154(b) by 457 days.

(21) Appl. No.: 11/091,252

(22) Filed: Mar. 28, 2005

(65) Prior Publication Data

US 2005/0273395 A1    Dec. 8, 2005

Related U.S. Application Data

(63) Continuation of application No. 09/751,268, filed on Dec. 29, 2000, now abandoned.

(51) Int. Cl.
  *G06Q 30/00* (2006.01)
(52) U.S. Cl. .................. 705/26; 705/4; 705/27; 714/E11.207
(58) Field of Classification Search .......... 705/26, 705/27, 4; 714/E11.207
  See application file for complete search history.

(56) References Cited

U.S. PATENT DOCUMENTS

| | | | |
|---|---|---|---|
| 4,827,423 A | 5/1989 | Beasley et al. | |
| 5,216,612 A | 6/1993 | Cornett et al. | |
| 5,794,207 A | 8/1998 | Walker et al. | |
| 5,960,411 A | 9/1999 | Hartman et al. | |

2003/0172002 A1 * 9/2003 Spira et al. ............... 705/27

FOREIGN PATENT DOCUMENTS

| | | |
|---|---|---|
| EP | 0467257 | 1/1992 |
| WO | WO-99/19819 | 4/1999 |

OTHER PUBLICATIONS

Datastream, see Press release, "Datastream Takes MRO to a New Level: E-Commerce"; Author not listed; Jan. 1, 2000; p. 1-2; www.imrglobal.com/pdf/datastream_projectprofile.pdf; received in the IDS filed by the applicant on Jun. 7, 2005; hereinafter Datastream.*
"Datastream Takes MRO to a New Level: E-Commerce"; Author Not Listed; Jan. 1, 2000; p. 1-2; www.imrglobal.com/pdf/datastream_project_profile.pdf.
"Real-Time Asset Management"; No Author Listed; Dec. 1999; p. 1-4; www.stdauto.com/ms2k%20pds/avantisam1.pdf.
Moozakis, Chuck; "Procurement App Will Go Wireless"; Dec. 11, 2000; p. 1-2; www.internetweek.com/ebizapps/ebiz121100-2.htm.

* cited by examiner

*Primary Examiner*—Yogesh C Garg
(74) *Attorney, Agent, or Firm*—Winstead PC

(57) ABSTRACT

A computer-implemented method for the replacement of equipment in a process control system for an industrial plant, in which a replacement operation is conducted at least in part by means of a first software application component for conducting e-procurement operations whereby one or more replacement devices complying with a defined specification may be procured from one or more external suppliers, which component is functionally linked with at least one second software application component for managing runtime operational data associated with said equipment, such that e-procurement operations may be initiated via said at least one second software application component.

30 Claims, 7 Drawing Sheets

EQUIPMENT PROCUREMENT METHOD AND SYSTEM

This patent application is a continuation of U.S. patent application Ser. No. 09/751,268 which was filed on Dec. 29, 2000 now abandoned. This patent application incorporates by reference the entire disclosure of U.S. patent application Ser. No. 09/751,268.

TECHNICAL FIELD

The present invention is concerned with computerized systems for supervision, maintenance and control of real world entities. In particular this invention is a method of providing computer-aided procurement of industrial or commercial equipment.

BACKGROUND ART

Replacement of parts and equipment for industrial manufacturing, process and control systems, herein referred to individually as an industrial plant, has traditionally been carried out by referring to information held in a maintenance system database of some sort. Parts of an industrial plant include for example pumps, valves, heating systems, robots, control systems, motors, drives for control systems, and other products used in industry, including for example the food industry, heavy and light manufacturing industries, oil and gas extraction and refining, chemical processes, mining, electrical generation, transport and distribution systems.

For many years it has been common practice for major manufacturing companies to communicate with customers and suppliers by means of computerised documents conforming to a standard known as Electronic Data Interchange (EDI). This standard is described in United Nations standards including EDIFACT and in US American National Standards Committee (ANSII) standards relating to EDI including Accredited Standards Committee (ASC) X12 standards for EDI. EDI has been characterised by expensive proprietary software, often custom software and complex, non standard implementation. With the emergence of the World Wide Web companies have begun to use user-friendly, open-standard, relatively inexpensive Web-browser technologies for purchasing by consumers, or Business to Consumer, so called B2C, and for purchasing by other corporate entities, or Business-to-Business, so called B2B. Within B2B the use of computerised customer-supplier communication in so-called e-procurement operations is expanding rapidly. For example e-procurement exchanges, or e-marketplaces, have recently been expanding in number; examples include Marrakech (www.marrakech.com), Ariba (www.ariba.com) and Buzzsaw (www.buzzsaw.com).

Standards for e-procurement transactions have been developed by the RosettaNet forum, see for example document "PIP3A1: Request Quote", Beta 01.00.00B, RosettaNet, 22 May 2000, which describes a standardised set of purchaser-supplier interaction processes for transmitting and responding to Request for Quotes (RFQs).

International patent application WO 99/19819, applied for by Intelisys Electronic Commerce, describes an electronic commerce system enabling corporate purchasers and suppliers to electronically transact, in e-procurement operations, for the purchase and supply of goods and services.

U.S. Pat. No. 5,960,411, issued to Amazon.com, Inc., describes a method to order a product over the Internet. In particular, the method and systems disclosed include method steps and computerised means to store details about an existing customer, associated with customer identification means such as a cookie, so that during future purchases the customer can purchase other products with a single "1-click" action, without having to re-enter address details identifying the customer. The method however discloses only how consumer products, principally products that the consumer does not already possess or have control over, may be purchased over the Internet.

SUMMARY OF THE INVENTION

In accordance with an aspect of the present invention, there is provided a computer-implemented method for the replacement of equipment in an industrial plant, in which a replacement operation is conducted at least in part by means of a first software application component for conducting e-procurement operations whereby replacement equipment may be procured from one or more external suppliers, which component is functionally linked with at least one second software application component in a process control system for which represents and manages runtime operational data associated with said equipment, such that e-procurement operations may be initiated via said at least one second software application component.

In accordance with a further aspect of the invention there is provided a procurement system for ordering equipment in a process control system for an industrial plant, said system including means for transmitting information including a specification for said apparatus and a means for communication with suppliers over a network, wherein the system comprises a first software application component for conducting e-procurement operations whereby one or more replacement devices complying with a defined specification may be procured from one or more external suppliers, which component is functionally linked with at least one second software application component for managing runtime operational data associated with said equipment, such that e-procurement operations may be initiated via said at least one second software application component.

By linking e-procurement operations functionally with at least one software application component for managing runtime operational data associated with said equipment, such that e-procurement operations may be initiated via said at least one software application component, the need for the involvement of separate personnel for individual equipment purchasing operations can be obviated. Instead, the purchasing operations can be controlled, or at least initiated, by an operator responsible for the runtime operation of the equipment in the industrial plant. Indeed the procurement operations can be controlled primarily by the process control system itself, whether or not human input is used to initiate and/or confirm procurement decisions which are being made.

One aim of the invention is to provide a purchasing method, and means for carrying out the method, such that the replacement equipment specification, held in the process control system, may be included in a procurement process such as a direct replacement purchase, a request for a quote (RFQ) procedure and/or a buying decision.

Information available in the control system, preferably directly associated with a software representation of an apparatus as an object in the system, is retrieved to enable e-procurement operations to decide when, how and where to procure replacement equipment including information about equipment failures and equipment maintenance information. This may also be carried out, in part at least, by one or more automatic processes. The maintenance information includes status information from condition monitoring, usage history such as number of operations performed, etc.

The control system may use an object-oriented model for all the equipment in the system. An object is derived from an object type, which holds information about how an object can be procured. This information includes schemas that can be used to procure equipment either internally from a stock or from external locations through communication over the Internet or other means.

An object may hold instance specific data that may be used together with the information in the object type to facilitate the procurement.

For each object in the system, maintenance information is available. This information can be used to identify what equipment is used and record, for example to what extent a particular equipment object has been used over a time period. This can then be compared with a pre-configured limit for a particular equipment to decide when to replace the equipment. Timing of a decision to replace equipment may be determined in several ways. As well as a planned method based on time, or time in use such as the above example, a planned predictive method may be used that takes into account characteristics of useage, eg starts and stops per unit time, average loads, average versus peak loads etc. Unplanned determinations may also be made on receipt of an alarm, or a reading above a pre-determined level, or a signal that an equipment has broken.

In accordance with a further aspect of the invention there is provided a computer program code element, comprising computer code means or software code portions for enabling a computer or a processor to retrieve information about replacement equipment, whereby said computer or processor carries out actions to receive information from a database detailing equipment specification; receive input identifying a parameter relating to delivery times; and conduct e-procurement operations to obtain at least one quote for a given specification and delivery time.

A financial evaluation of the prices and delivery times may be carried out to calculate "what if" scenarios. Moreover, a price or price/delivery specification of the apparatus or part thereof may also be evaluated in one or more iterations to obtain a specification with an optimum financial cost.

In accordance with a yet further aspect of the invention, there is provided a computer data signal embodied for communication in a computerised system, the communication being associated with replacement of equipment in a process control system for an industrial plant, wherein the data signal comprises information derived from a maintenance specification representing said equipment in a software application for conducting runtime maintenance of said equipment in the control system.

Embodiments of the invention include use of the schemas and directions stored with an object type to query available locations such as e-commerce sites or for cost and availability of replacement equipment. The maintenance information kept in the system may also be used to produce replacement schedules for upcoming replacement operations based on a range of replacement criteria including condition based replacement.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE EMBODIMENTS

Figure 1:
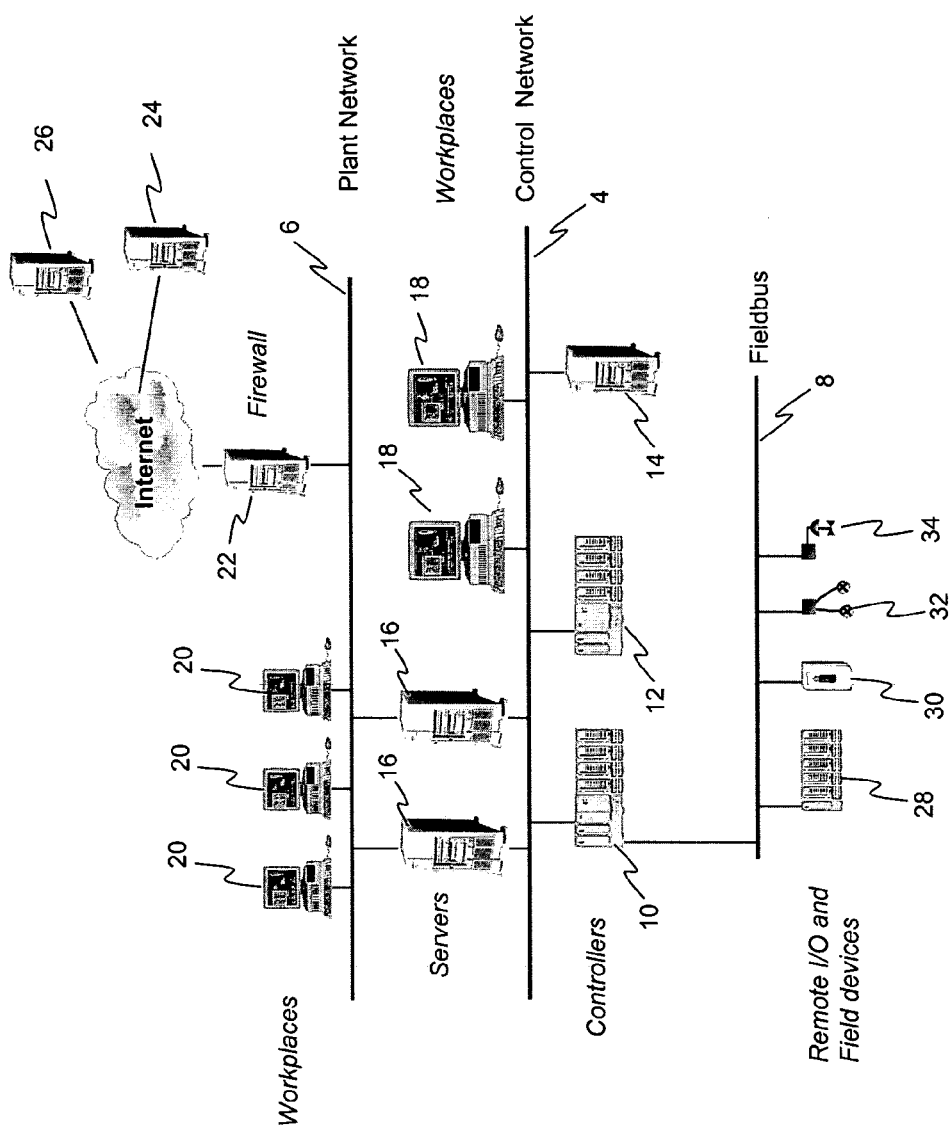
FIG. 1 shows a schematic layout of a control system for a process in an industrial plant.

FIG. 1 illustrates an exemplary arrangement of a process control system in an industrial plant 2. The system includes a control network 4, a plant network 6 and one or more fieldbuses 8. The control network 4 is a local area network (LAN) to which controllers 10, 12, 14 and servers 16, 18 are connected. The plant network 6 is connected to the servers 16, 18, workplace computers 20, and a gateway/firewall 22 via which connection to the Internet is achieved. E-commerce servers 24, 26, which are e-procurement enabled, are thus accessible from plant network 6 via the Internet. E-commerce server 24 is an exemplary e-marketplace, whereas e-commerce server 26 is an exemplary front end procurement system of an equipment manufacturer. The plant network 6 is also used for communication between servers and between workplace computers and servers. Some servers 18 may function as combined servers and workstation computers. Each workstation computer 18, 20, comprises user interface means, such as a computer monitor, a keyboard, a pointing device such as a mouse, voice interaction means, etc, and functions as a client whereby an operator may control operation of equipment via equipment controllers 10, 12, 14, via a respective server 16, 18.

The fieldbuses 18 are used to interconnect field devices 28, 30, 32, 34, such as in/out modules, smart sensors and actuators, regulators, variable speed drives, or single loop devices. A sensor on a device such as a pump etc. may also be connected directly to the pump etc. and not via a fieldbus.

Figure 2:
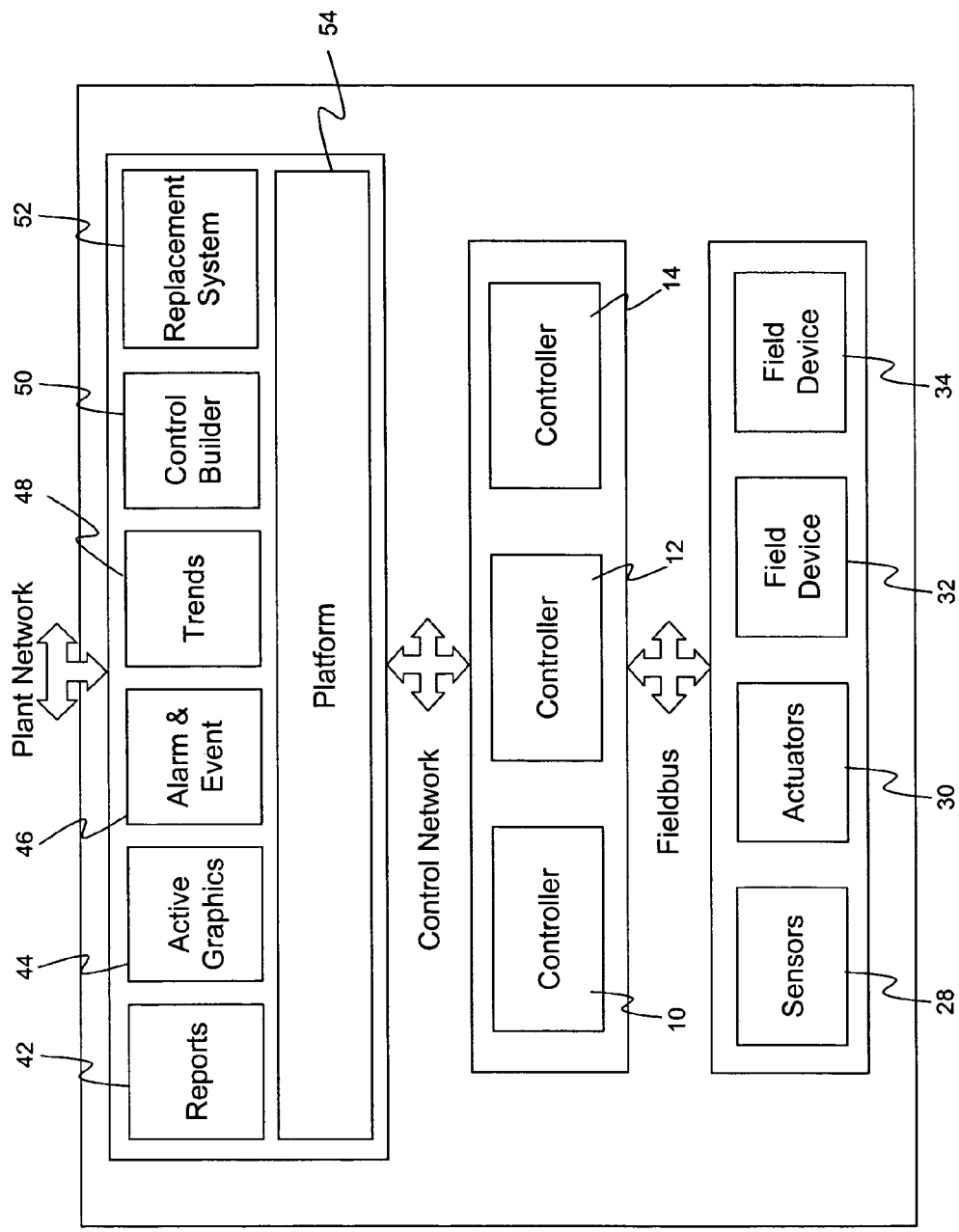
FIG. 2 shows a schematic arrangement for an architecture of a control system for a process in an industrial plant.

FIG. 2 illustrates the functional architecture of the process control system of the industrial plant. The system includes a number of different software application components, such as a report presentation application 42, an active graphics application 44, an alarm and event application 46, a trends analysis and presentation application 48, a control builder 50, and a replacement system 52, all of which are referred to herein as aspect systems, running on a software platform 54. Only a subset of the available aspect systems is shown in FIG. 2. The aspect systems 42-52 may be implemented as object-oriented software components supported by an object-oriented platform 54. Aspect systems 42-52 may for example implement Microsoft™ ActiveX™, whilst platform 54 may implement a user interface using HTML or XML. Software platform 54 interacts with controllers 10, 12, 14, which in turn control and communicate with field devices 28-34.

The control system here described uses an object-oriented model for all the equipment in the system. An object is derived from an object type, which, amongst other things, holds information about how the related equipment can be procured. This information includes e-procurement schemas that can be used to procure equipment over the Internet or other media. An object may hold instance specific data that may be used together with the information in the object type to facilitate the procurement.

For each item of equipment in the plant, maintenance information is available in the process control system. This information can be used to identify what the equipment is and to what extent a particular item of equipment has been used over a time period. This can, for example, be compared with a configured limit to decide when to replace the equipment. The configured limit may be other than simply time based, and may be condition based, performance based, useage based or be any combination of time, use, load etc. factors.

Each item of equipment in the system has one or more graphical representations. Through this graphical representation, various information available in the process control system for the object can be accessed by a plant maintenance operator. The replacement procurement is in this embodiment initiated by an operator interacting with a graphical user interface on which a graphical representation of the item of equipment is shown.

Figure 3:
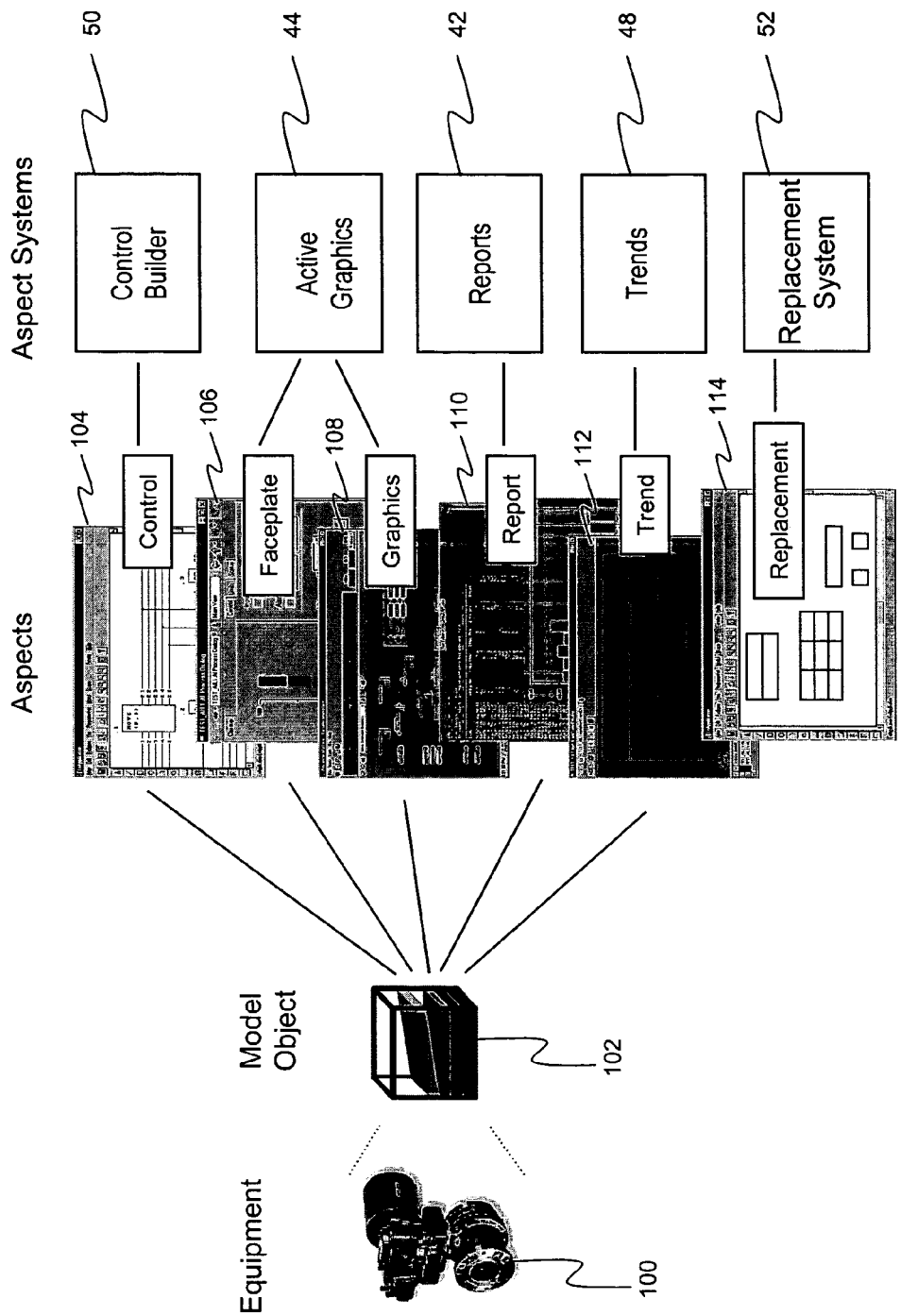
FIG. 3 shows a schematic arrangement for managing objects representing and/or containing information about equipment in a process in an industrial plant within a control system.

FIG. 3 illustrates a schematic representation of the way in which information relating to an object is managed in the process control system. Each item of equipment 100 is represented by a model object 102 which is a container of references, including an object-oriented component directory, to different representations of information, referred to as aspects 104-114, relating to the equipment in question. Only a subset of the available aspects is illustrated in FIG. 3. Each aspect is provided by an aspect system component. Thus, a control aspect 104 is provided by control builder component 50, a faceplate aspect 106 and a process graphics aspect 108 are each provided by active graphics component 44, a report aspect 110 (such as for example a production report, a maintenance record, a cost of operation report, a quality report) is provided by reports component 42. A historical trend aspect 112 is provided by trends component 48. A replacement aspect 114 is provided by replacement system component 52.

Figure 4:
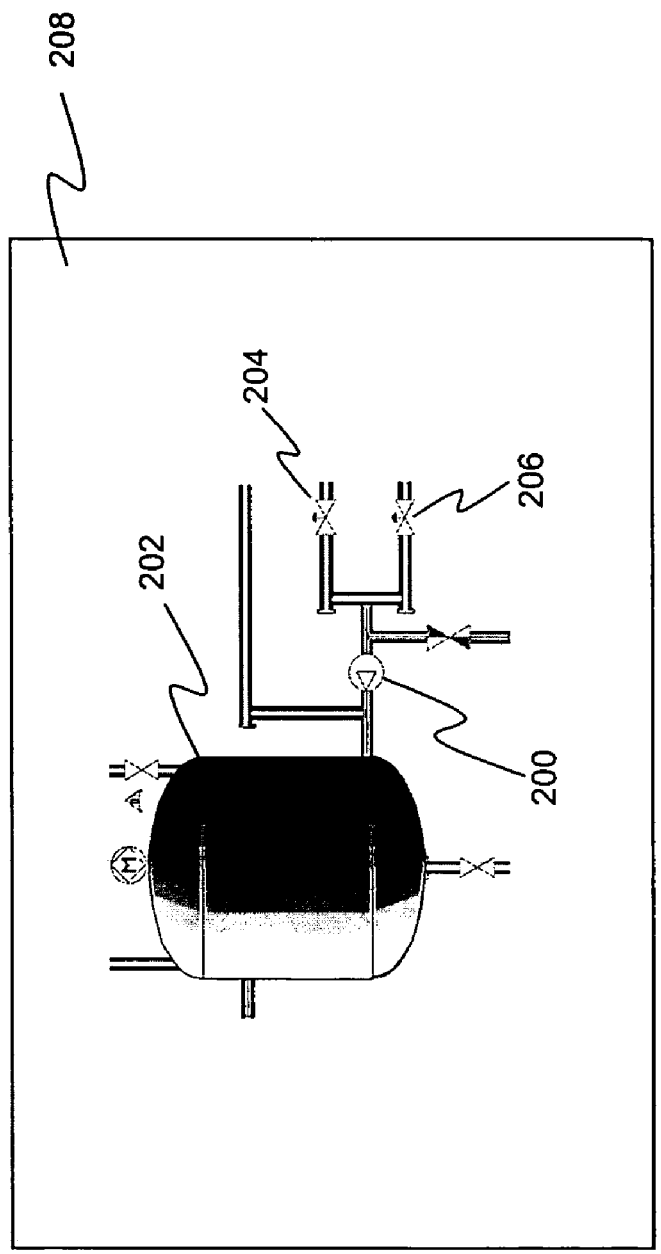
FIG. 4 shows a graphic representation of objects on a screen of an operator work station which objects represent equipment in a process in an industrial plant controlled by a control system.

FIG. 4 illustrates a graphics aspect 108 of an item of plant equipment, as seen by an operator on the graphical user interface of a workplace computer 18, 20, whereby runtime maintenance and control operations may be carried out for an item of equipment illustrated therein. The equipment may for example be a one-way valve 200 illustrated as an icon functionally interrelated with other process equipment 202, 204, 206 on a scrolling display 208.

Figure 5:
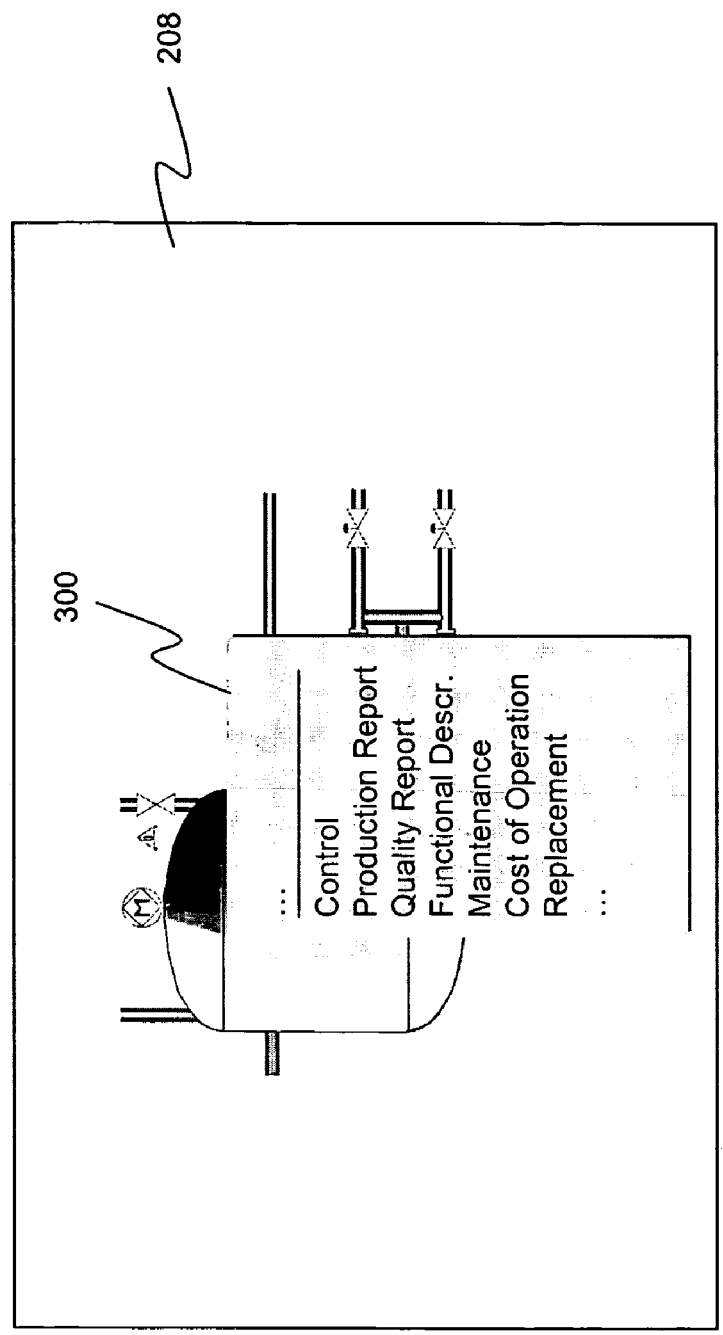
FIG. 5 shows a schematic example of a maintenance menu displayable on the operator work station in relation to objects representing equipment in the process in an industrial plant controlled by a control system.

The operator may access any of the aspects relating to an item of equipment by selecting the appropriate representation of the item, for example by right-clicking on the mouse, as the cursor is located over the appropriate icon on the screen. FIG. 5 illustrates an exemplary maintenance menu 300 which is displayed in response to the selection operation. The menu includes a selectable list of the aspects available for the item of equipment in the process control system, for example a control aspect, a production report, a quality report, a functional description of the item, a maintenance report, a cost of operation report and a replacement aspect. On selecting one of the aspects, the operator is presented with a graphical representation of the aspect selected. For example, if the control aspect is selected, the graphical user interface of the control aspect system may used to alter runtime parameters relating to the selected item. All reporting functions relating to the item may similarly be accessed.

In this embodiment of the invention, a replacement aspect relating to the item is also accessible via the menu 300. On selecting the replacement entry, the operator is presented with a graphical user interface which describes the projected lifecycle of the item of equipment, for example the projected replacement date, which may be calculated by the replacement aspect system on the basis of data received from other of the aspect systems which describe the item. For example, the data may include data from the functional description identifying the manufacturer's average equipment lifetime, data from the production reports identifying the amount of usage the equipment has undergone since installation, data based on condition monitoring, characteristics of use or loading, ratio of start/stops to service period, etc.

The replacement aspect also provides a selectable icon, marked for example "REPLACE NOW" whereby the operator can override the projected lifecycle and initiate replacement of the selected equipment. An operator may select this option for a number of reasons, based on an analysis of the present state of the equipment via the other available aspects.

Figure 6:
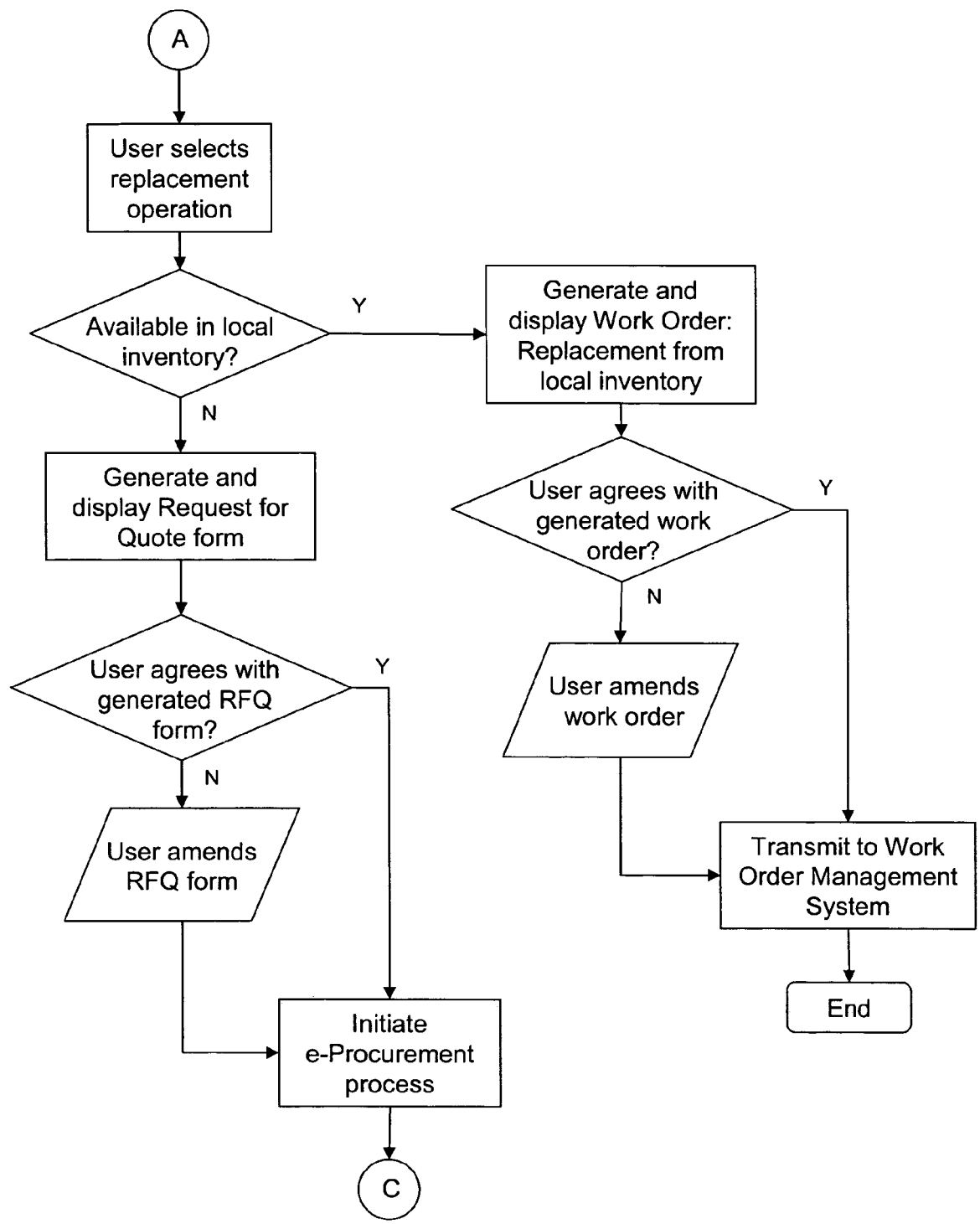
FIG. 6 shows a schematic flow chart of a method to replace an equipment according an embodiment of the invention.

Referring to FIG. 6. An operator selects the icon REPLACE NOW at point A. A query is made to check if the replacement item is available in a local parts storage or inventory. If it is available, Y, then an internal work order is generated and displayed to replace from a local inventory. The operator accepts or confirms acceptance, Y, and the work order is then sent to the appropriate management or maintenance department for action. If not, N, the operator amends the work order until the details of the order are satisfactory, and when satisfactory sends the work order to the appropriate department for action as above.

If the replacement item is not available in a local inventory, N, then a form such as a request for quote (RFQ) is generated and displayed. For simple, inexpensive items a simplified order form or simple price estimate request for may be used. The operator checks the form and if it is correct, accepts or confirms acceptance, step Y. The e-procurement process is then initiated. If the operator does not accept the RFQ form, step N, then he/she makes alterations till the form is correct and then sends it to the initiate e-procurement stage C.

A method, in accordance with an embodiment of the present invention, for replacement of an apparatus is further detailed as follows. The plant operator examines a display that includes a view containing one representation of an object that represents the apparatus to be replaced. Using a computer mouse or other selection means the operator:

finds the object in a graphical representation,
right-clicks on the object to bring up a context menu.
selects an entry to replace the apparatus.

The system then retrieves information available in the object instance and the object type to query a set of pre-selected or pre-configured e-commerce sites for available replacement units.

If an acceptable replacement unit is found, it is either automatically procured or the user initiating the operation is asked to confirm the operation. A final confirmation may be sent to the user to obtain final authorisation before an order is sent.

The method described above is implementable by means of a replacement aspect system in the form of software suitable for use over the Internet by means of Hypertext MarkUp Language (HTML) code, Compact HTML (cHTML) Java (Trade Mark) programming, extensible Markup Language (XML) pages and the like open standard web browser and Transmission Control Protocol/Internet Protocol (TCP/IP) techniques. In an advantageous use of the invention, one or more software implementations of the method may be arranged to search for and access one or more Internet accessible systems for marketing and sales of industrial apparatus and products such as those types mentioned. By this means a software application or computer program may, like any other prospective customer, browse information about an apparatus or a product, and carry out some or all of the following e-procurement operations:

selecting an apparatus,
  selecting a specification for the apparatus,
  selecting one or more delivery conditions,
  optimising a price, and/or,
  optimising a delivery condition,
  comparing to predetermined prices and/or delivery conditions,
  making a purchase decision,
  sending a purchase order to a seller or supplier, for the present apparatus and specification.

Preferably this is carried out by means of standard e-procurement protocols, such as those defined by RosettaNet, provided at a web site wherein the financial cost of a product or equipment may evaluated according to the methods described above. The user may then send an accepted specification to a purchase process for a price (with or without conditions) and subsequently to make a buying decision. A buying decision may for example be applied to a relatively simple purchase decision such as a motor or to a relatively complex procurement process such as a part of a paper mill control system or a power distribution system.

The preferred type of e-procurement document transmitted between the purchaser and supplier comprises an open standard document, using for example a type of XML file. The document may also conform to one or more current standards for electronic documents such as EDIFACT or ASC X12; and/or to similar standards issued by other recognized bodies including commercial or financial organizations such as Society for Worldwide Interbank Financial Telecommunication (SWIFT). Other current standards capable of use for electronic data interchange include Document Object Model (DOM), Microsoft's (Trade Mark) MSXML and a standard called XHTML 1.0 provided by World Wide Web Committee (W3C). The transmitted e-procurement document comprises necessary details such as any of:

identification of document type
  authorization details,
  security details,
  contact details,
  acknowledgement request details,
  cancellation details
  contract references for seller, manufacturer,
  ordered item identification,
  UPC reference,
  delivery details, carrier and options.

In a preferred embodiment of the invention, specifications may be changed and the price evaluation re-run a plurality of times until an iteration produces a cost that is acceptable according to a pre-determined value. This may be carried out by a human user or by a computer or computer program accessing the procurement means.

The procurement means may include an operator or computer program log-in so that a procurement process may interrupted, or delayed, and re-started one or more times. By this means, a user or computer or computer program may return to the procurement process at a later date and review, re-analyse or continue with evaluation of changes to a specification. The individual user history of the operator/computer program in the procurement means is associated with a logged in user by means of known identification means such as password, stored digital file or marker such as a cookie stored on the user machine, or combinations of identification means.

The specification sent to the seller and/or manufacturer to obtain a replacement apparatus or part as a result of a procurement process by a purchaser is preferably in the form of an order or purchase order.

In the case that an operator does not decide to over-ride the scheduled replacement date for the item of equipment, the replacement aspect system may itself alter the scheduled replacement date in response to data received from the other aspect systems. The replacement aspect system may for example be informed by the control aspect system of a detected failure in an item of equipment. In this case, replacement of the equipment is immediately initiated. In other cases, the scheduled replacement date may be altered due to varying production conditions monitored by the process control system. Alteration of a replacement date may be conducted without any specific operator input, or may require operator authorisation.

In the above-described embodiment, the initiation of e-procurement operations may be conducted by the operator. Initiation of e-procurement operations may also be conducted automatically by the replacement aspect system, when a scheduled, or unscheduled, replacement date or date range approaches. Initiation may occur in response to the detection of a predetermined trigger event, for example the current date being within a predetermined period (which may vary between different types of equipment) from the scheduled replacement date.

Figure 7:
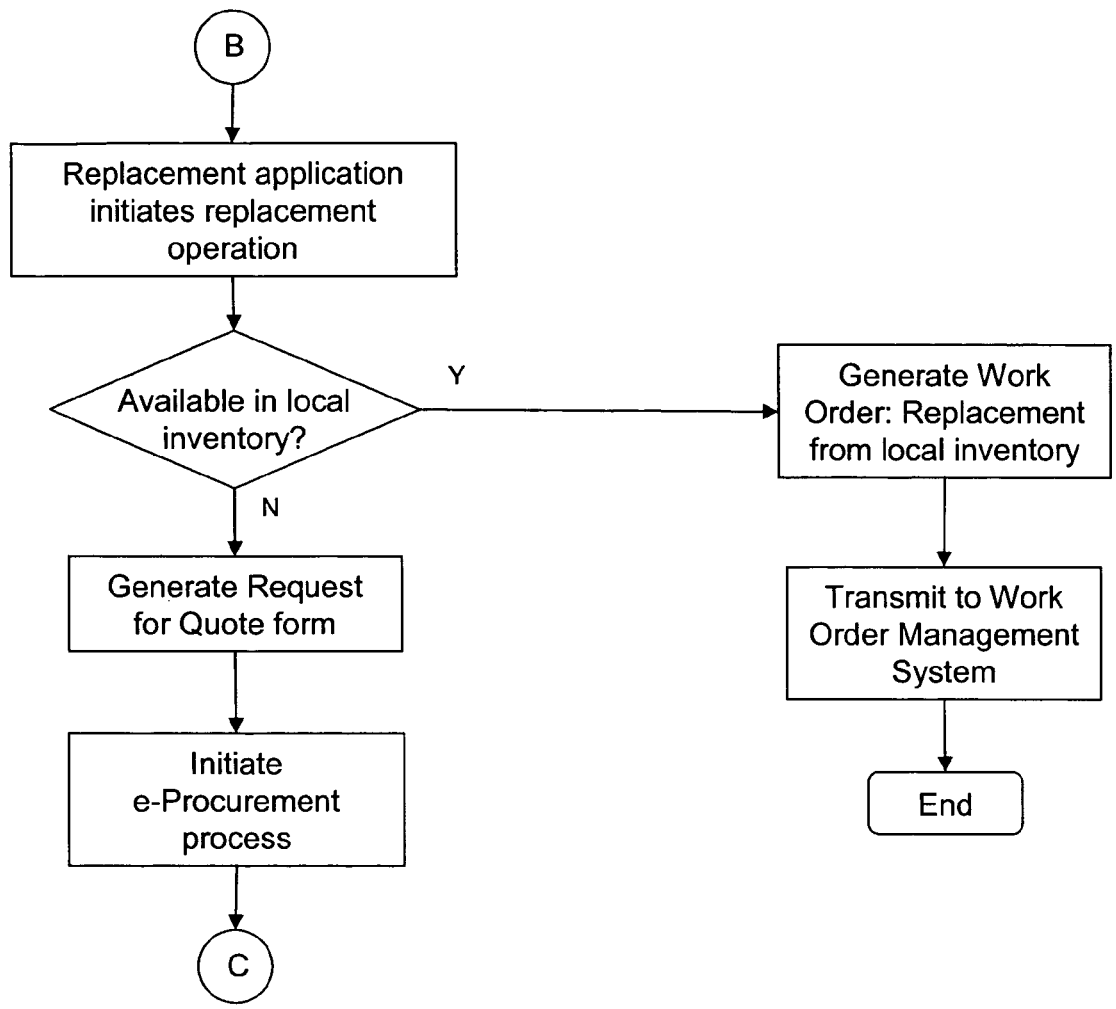
FIG. 7 shows a schematic flow chart of a method for e-procurement of a replacement equipment by means of a replacement application according an embodiment of the invention.

FIG. 7 shows a flowchart starting at point B, where a replacement application initiates a replacement operation according to an aspect of the invention. The replacement application first makes a query to see if the item is available in local inventory. If it is so, Y, then the replacement application generates a work order for replacement from the local inventory and transmits it t the appropriate maintenance or other department(s). If the item is not in local inventory, N, the replacement application generates a RFQ form and initiates an e-procurement process.

It is necessary to point out that a purchase process according to the invention to procure a simple item such as a single electric motor, of an optimised selection of specifications such as horsepower, revolutions per minute, frame size etc. may involve retrieving information from a potential supplier containing only one price and no or very few associated conditions. The invention is also applicable to procurement of more complex systems or arrangements of a plurality of apparatus. Procurement of more complex systems, in which negotiations or face-to face meetings of representatives may be included in the purchasing process.

In another embodiment of the invention, the method may also include a decision stage in which a procurement decision has to go through an approval stage. In the case of a purchase in excess of, for example, a specified amount of money, the procurement process is suspended while approval is sought from a person with appropriate authority for spending such an amount. When approval is returned the e-procurement process continues as before.

The method can also be implemented at least in part via a telephone, or portable computer (including any kind of computing device including Laptops and Personal Digital Assistants (PDAs) such as Palm Pilots (Trade Mark), etc), with a connection or a wireless connection to a telephone or data network. This is best carried out using a telephone, computer or portable computer, suitably equipped for communication with digital networks such as by means of compatibility with Wireless Application Protocol (WAP), I-Mode or Bluetooth. Such a telephone may be used to display information and provide interactive communication with networked or Internet embodiment of the invention. Such a telephone equipped to receive and/or manipulate information from the purchase process and make choices or issue commands may be used to:

- select an apparatus or equipment to be replaced,
- initiate a procurement to replace the equipment,
- run evaluations,
- run life cycle analysis or other environmental evaluations,
- proceed to a buying decision, and
- decide to buy or not buy, by means of menu-driven or graphic user interface (GUI) driven software running on the telephone. The software running on the telephone is preferably software enabled for graphic manipulation of symbolic means displayed by the telephone based on HTML, cHTML, XML, similar or other software including such as iMode, Wap Markup Language WML and similar. Similar other software can include protocols such as Handheld Devices markup Language (HDML).

The present invention is not limited only to industrial process control systems and can also include other types of applications, such as, for example, instruments, parts from building control systems, systems on board a ship, sensors, measuring instrument or valves etc for processes and/or control systems for process control in manufacturing plants, paper mills, rolling mills, car assembly plants, oil and gas installations, refineries etc.) The term "industrial plant" as used herein should be construed accordingly.

The invention claimed is:

1. A computer-implemented method for replacement of equipment in a plant arranged with an industrial control system, the method comprising:
   providing a computer-based industrial control system for industrial process or manufacturing control, the computer-based control system comprising:
      a plurality of model objects, each model object of the plurality of model objects representing an item of equipment and containing at least one reference to a plurality of aspects, each aspect of the plurality of aspects representing an item of information or functionality related to the item of equipment; and
      wherein the plurality of aspects comprises at least one first aspect related to control of the item of equipment and at least one second aspect operable to provide information and functionality for use in initiating procurement of a replacement for the item of equipment;
   monitoring, via the industrial control system, a plurality of industrial equipment operational data;
   conducting, via the at least one second aspect, e-procurement operations, wherein at least one replacement device complying with a defined specification may be procured from at least one external supplier;
   linking the at least one second aspect with the at least one first aspect for representing and managing the plurality of industrial equipment operational data associated with said equipment in said industrial control system;
   selecting the at least one second aspect for procurement; and
   initiating, via functions provided by the at least one second aspect, e-procurement operations responsive to the industrial equipment operational data.

2. The method according to claim 1, wherein said at least one second software application component comprises a reporting software function for reporting on an operational condition monitored during runtime of the plant.

3. The method according to claim 2, wherein said at least one second software application component comprises a function for producing at least one of a production report, a quality report, and a cost of operation report.

4. The method according to claim 1, wherein said at least one second software application component comprises a control software function for controlling operational conditions relating to said equipment.

5. The method according to claim 1, wherein said at least one second software application component comprises a graphical software function for producing a graphical runtime representation of said equipment in its operational context of said plant, whereby a management function for said runtime operational data is accessed.

6. The method according to claim 5, further comprising the steps of:
   selecting, by a user, a presentation of a menu via said graphical runtime representation of said equipment;
   retrieving a specification stored or generated on the basis of stored data, for said equipment; and
   procuring a replacement apparatus according to at least part of said specification.

7. The method according to claim 6, further comprising the step of providing said user with an option to alter said specification after the specification is retrieved.

8. The method according to claim 6, wherein said presentation is selected from a graphical representation on a screen from at least one of:
   a computer connected by a LAN network to the process control system; a computer connected by a WAN network to the process control system; a computer connected by a telephone network to the process control system;
   a computer connected by a short range radio link to the process control system;
   a mobile telephone connected by a telephone network to the process control system; and
   a mobile telephone connected by a short range radio link to the process control system.

9. The method according to claim 6, further comprising providing said user with confirmation data once a preferred replacement has been identified, and said user selecting an option to execute a purchase of said replacement apparatus.

10. The method according to claim 1, wherein said initiating e-procurement operations further comprise the steps of:
    requesting, via a data communications network, a plurality of proposals for supply from a plurality of different suppliers; and
    selecting a preferred replacement from said plurality of proposals.

11. The method according to claim 1, wherein said e-procurement operations comprise the step of requesting an approval for a purchase of a predetermined value from a person or process having authority to give approval to make said purchase.

12. The method according to claim 1, wherein said initiation of e-procurement operations is arranged to occur automatically in response to said industrial equipment operational data associated with said equipment received from said at least one second software application component.

13. The method according to claim 1, further comprising the steps of:

examining one or more prices and conditions retrieved in the e-procurement operations;
forming a negative buying decision;
changing at least one part of a replacement apparatus specification to initiate a modified e-procurement process;
examining one or more new prices and conditions retrieved in the modified e-procurement process; and
transmitting a purchase confirmation to an identified preferred supplier.

14. The method according to claim 1, further comprising the steps of:
performing iterations of cost evaluation of the specification in which specification factors or parameters are changed judging each evaluation result in accordance with a predefined algorithm to finalise an e-procurement process.

15. The method according to claim 1, further comprising a computer program code element, comprising computer code or software code portions operable for enabling a computer or a processor to carry the steps of the method according to claim 1.

16. The method of claim 1, further comprising:
providing, via at least one further aspect, functions for reporting at least one operational condition of the item of equipment; and
deciding to initiate procurement of the replacement for the item of equipment based on the at least one operational condition.

17. The method of claim 1, wherein the plurality of aspects comprises at least one third aspect operable to provide a software function for producing a graphical representation of the item of equipment in an operational context, the graphical representation operable to allow a user to select a model object from the plurality of model objects and an aspect from the plurality of aspects associated with the selected model object.

18. The method of claim 17, further comprising:
selecting, by a user, a presentation of a menu via the graphical representation of the item of equipment;
retrieving a specification stored or generated by at least one aspect of the plurality of aspects associated with at least one model object of the plurality of model objects representing the item of equipment; and
initiating the procurement of the replacement for the item of equipment according to at least part of the specification.

19. The method of claim 1, further comprising:
requesting, via a data communications network, a plurality of proposals for supply of replacement equipment from a plurality of suppliers;
reviewing the plurality of proposals; and
selecting at least one proposal of the plurality of proposals.

20. The method of claim 1, wherein a software component of the computer-based control system is operable to automatically select the at least one second aspect for initiating procurement.

21. The method of claim 20, wherein the software component is provided an aspect to a model object of the plurality of model objects that represents the item of equipment.

22. The method of claim 20, wherein the software component initiates procurement based on at least one operational condition of the item of equipment.

23. A procurement system for ordering equipment for an industrial plant, said system operable for transmitting information including a specification for said equipment and operable for communication with suppliers over a network, the procurement system comprising:
a computer-based industrial control system operable to monitor industrial equipment operational data, the industrial control system comprising;
a plurality of model objects, each model object of the plurality of model objects representing an item of equipment and containing at least one reference to a plurality of aspects, each aspect of the plurality of aspects representing an item of information or functionality related to the item of equipment;
wherein the plurality of aspects comprises at least one first aspect related to control of the item of equipment and at least one second aspect operable to provide information and functionality for use in initiating procurement of a replacement device for the item of equipment; and
a first software application component, corresponding to the at least one first aspect, operable to conduct e-procurement operations, and procure the replacement device complying with a defined specification from at least one external supplier;
a functional link between said first software application component and at least one second software application component, corresponding to the at least one second aspect, selected for procurement, for managing industrial equipment operational data associated with the item of equipment in said computer-based industrial control system; and
e-procurement operations, initiated via said at least one second software application component responsive to said industrial equipment operational data.

24. The procurement system according to claim 23, wherein the system is operable for communicating the specification for said at least one replacement device to at least one manufacturer or supplier of the at least one replacement device or part or related service thereof.

25. The procurement system according to claim 23, comprising software operable to match a registered or identified logged-in prospective customer to a history of details of specification selection, and subsequent changes to specification stored in a database of the system.

26. The procurement system according to claim 23, comprising software operable to match a registered or identified logged-in prospective customer to a history of details of specification selection comprising a digital identifier such as a cookie stored in a computer used by the prospective customer.

27. The computer-implemented control system of claim 23, wherein the control system is operable to communicate the specification for the replacement device to at least one manufacturer of the replacement device or part or related service thereof.

28. The computer-implemented control system of claim 23, wherein the control system is operable to match a registered or identified logged-in prospective customer to a history of details of specification selection, and subsequent changes to specification stored in a database of the control system.

29. The computer-implemented control system of claim 23, wherein the control system is operable to match a registered or identified logged-in prospective customer to a history of details of specification selection comprising a digital identifier such as a cookie stored in a computer used by the prospective customer.

30. A computer program contained in a computer readable medium, comprising computer program code operable to make a computer or processor carry out the steps of:
monitoring, via an industrial control system, a plurality of industrial equipment operational data;

wherein, each item of industrial equipment is represented by a model object of a plurality of model objects, each model object containing a reference to a plurality of aspects, each aspect of the plurality of aspects representing an item of information or functionality related to the item of equipment;

wherein the plurality of aspects comprises at least one first aspect related to control of the item of industrial equipment and at least one second aspect operable to provide information and functionality for use in initiating procurement of a replacement for the item of equipment;

conducting, via the at least one first aspect, e-procurement operations, wherein at least one replacement device complying with a defined specification may be procured from at least one external supplier;

linking the at least one first aspect with the at least one second aspect for representing and managing the plurality of industrial equipment operational data associated with an equipment;

selecting the at least one second aspect for procurement; and initiating e-procurement operations, via said at least one second aspect, responsive to the plurality of industrial equipment operational data associated with said equipment.

* * * * *